United States Patent
Bloom et al.

(10) Patent No.: US 10,355,431 B1
(45) Date of Patent: Jul. 16, 2019

(54) CONSOLIDATED AUTOMOTIVE PIGTAIL CONNECTOR AND REPLACEMENT PARTS KIT

(71) Applicant: Omega Acquisition Corp., Irving, TX (US)

(72) Inventors: Earl Bloom, Irving, TX (US); Scott Gilman, Trabuco Canyon, CA (US)

(73) Assignee: Omega Acquisition Corp., Irving, TX (US)

(*) Notice: Subject to any disclaimer, the term of this patent is extended or adjusted under 35 U.S.C. 154(b) by 0 days.

(21) Appl. No.: 15/851,489

(22) Filed: Dec. 21, 2017

(51) Int. Cl.
*H02G 3/06* (2006.01)
*H01R 24/20* (2011.01)
*H02G 15/18* (2006.01)
*H01R 4/72* (2006.01)
*H01R 4/20* (2006.01)
*B60R 16/02* (2006.01)
*H01R 13/52* (2006.01)
*H01R 103/00* (2006.01)

(52) U.S. Cl.
CPC ............ *H01R 24/20* (2013.01); *B60R 16/02* (2013.01); *H01R 4/20* (2013.01); *H01R 4/72* (2013.01); *H01R 13/5202* (2013.01); *H02G 15/1806* (2013.01); *B60Y 2410/115* (2013.01); *H01R 2103/00* (2013.01); *H01R 2201/26* (2013.01)

(58) Field of Classification Search
CPC . H02G 3/06; H02G 7/05; H02G 15/22; H01R 11/00; H01R 25/003
USPC ................................ 174/84 R, 84 C; 439/502
See application file for complete search history.

(56) References Cited

U.S. PATENT DOCUMENTS

| | | | | |
|---|---|---|---|---|
| 3,889,047 A * | 6/1975 | Carver | ................... | B29C 61/00 156/49 |
| 5,070,597 A * | 12/1991 | Holt | ........................ | F16L 5/02 138/103 |
| 5,374,784 A * | 12/1994 | Wentzel | ............... | H02G 15/103 156/49 |
| 5,997,186 A * | 12/1999 | Huynh | ................ | G02B 6/4446 385/135 |
| 6,672,900 B2 * | 1/2004 | France | ............... | H01R 13/5205 439/587 |
| 8,653,368 B2 * | 2/2014 | Genco | .................... | H01R 4/186 174/77 R |

\* cited by examiner

*Primary Examiner* — Hien D Vu
(74) *Attorney, Agent, or Firm* — The Law Offices of Alexander Deese, PLLC

(57) ABSTRACT

A consolidated automotive parts kit containing the parts necessary to replace and seal a switch, relay, or transducer in a vehicle and perform repairs to the corresponding connector using a pigtail and associated repair supplies such as butt splices, heat shrink tubing, and seals or gaskets.

4 Claims, 2 Drawing Sheets

CONSOLIDATED AUTOMOTIVE PIGTAIL CONNECTOR AND REPLACEMENT PARTS KIT

BACKGROUND OF THE INVENTION

Field of the Invention

The present invention relates to the field of repair kits for electrical connectors, and more specifically to automotive vehicle repair kits for relays, switches, and transducers.

Background of the Invention

When an electrical connector in a vehicle is damaged by wear, an electrical short, or another issue the damaged part must be serviced and replaced. However, the damage is frequently contained to the connector and nearby associated parts. Rather than replace the entire device attached to the connector, a mechanic repairing the vehicle can instead sever and replace the damaged connector using a pigtail connector and associated repair materials compatible with the vehicle.

However, this can be a time consuming process as pigtails are not marketed in kits with associated parts and are instead sold individually. This means the mechanic must identify a compatible pigtail. They must select compatible repair supplies to use repair the connection between the damaged part and the pigtail. Finally, they must also separately identify and order the replacement part that originally joined the connector. Often, the required parts and repair supplies vary when repairing different pigtails, which means the mechanic must research the parts to identify compatible seals, butt splices, heat shrink tubing, pigtails, and their corresponding switch, relay, or transducer. These parts must be ordered separately and if any part is not compatible or one of the orders is delayed, the entire repair cannot be completed until the problem is resolved.

When replacing parts that join with electrical connectors, there is a risk of connector breakage. For example, when a mechanic replaces a pressure transducer there is a possibility that the electrical connector will become damaged during removal of the old transducer or insertion of the new transducer. In older models of car, the plastic in the connector may have become aged and brittle and snaps easily when disturbed during servicing. Some versions of connector may seal tightly to the associated part and be difficult to dislodge without damaging the connector.

Alternatively, the connector may short, damaging the connector and the associated part but leaving the remainder of the device attached to the connector intact. If this occurs, the mechanic needs to order a pigtail connector compatible with the part in order to replace the connector, along with compatible repair materials and any seals used with the connector. This leads to long wait times for the mechanic's customers due to the need to identify, order, and ship a compatible pigtail and repair materials. The customer may have already waited for some time while the original replacement part was shipped, and now must wait again while this second repair is carried out. As such, there is a need for a consolidated kit which provides a part typically joined to an electrical connector, a compatible pigtail connector and repair supplies, allowing mechanics to immediately replace connectors damaged during repairs without waiting to identify and order replacements.

SUMMARY OF THE INVENTION

It is an object of the present invention to provide a comprehensive kit containing the parts necessary to replace and seal a switch, relay, transducer, or sensor in a vehicle and perform repairs to the corresponding connector using a pigtail.

It is another object of the present invention to provide a consolidated kit containing all compatible parts and repair supplies required to repair a part and connector damaged by an electrical short.

It is another object of the present invention to provide a set of kits containing the parts necessary to replace a part and repair its corresponding connector, with the kits being consolidated by make, model, and year of the vehicle being repaired.

DETAILED DESCRIPTION

Figure 1:
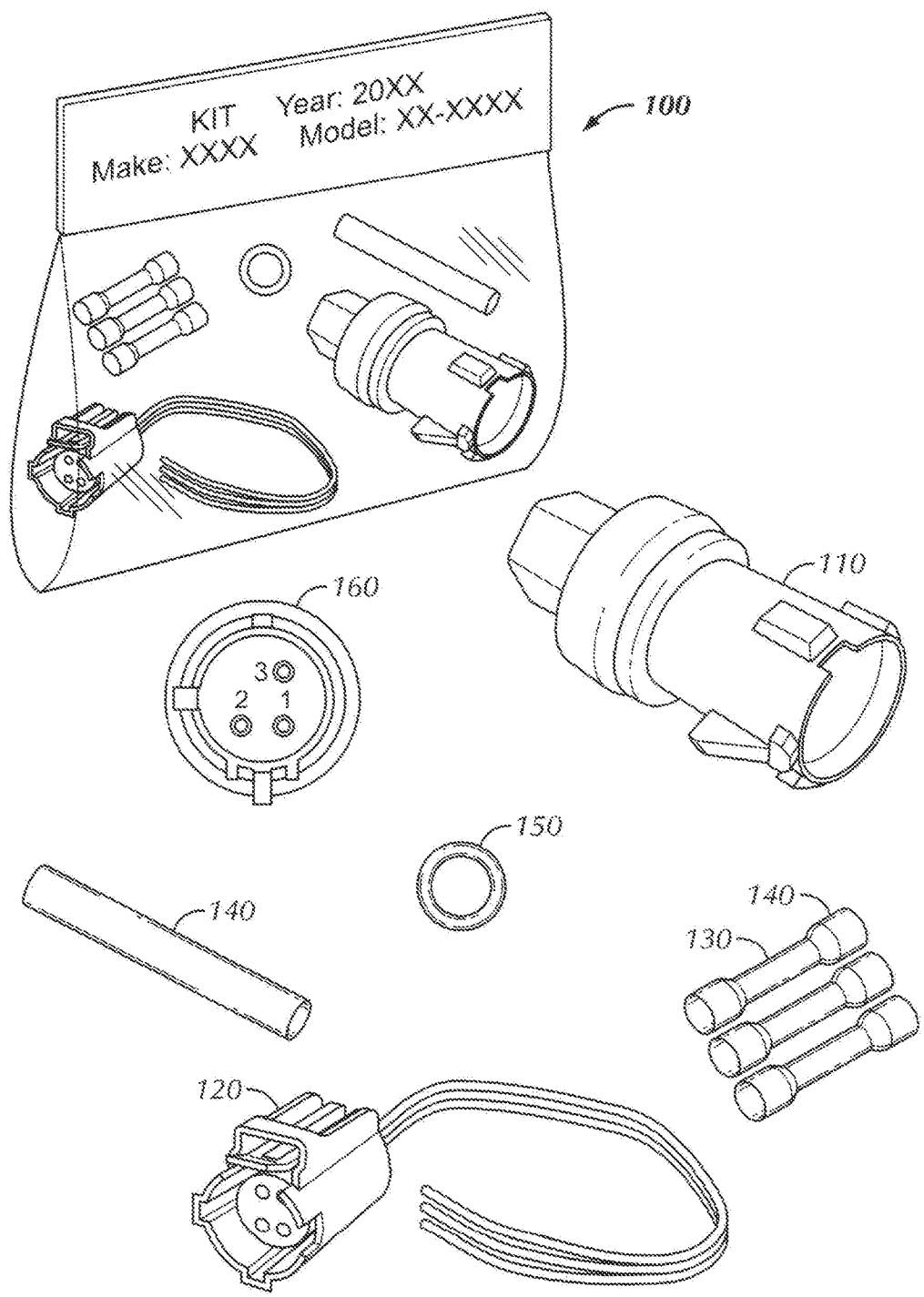
FIG. 1 shows an example pigtail kit in accordance with a preferred embodiment of the invention.

FIG. 1 shows an example kit in accordance with a preferred embodiment of the invention. The pigtail kit 100 contains an assortment of parts required to repair a connector which are compatible with a specific vehicle or set of vehicles. In FIG. 1, the kit shown contains a pressure transducer 110, a compatible pigtail connector 120, three butt splices 130, heat shrink tubing 140, and an O-ring seal 150.

In order to repair a shorted connector using the pigtail kit 100, a mechanic would first replace the pressure transducer 110 and O-ring seal 150 with replacements from the kit. Next, the mechanic cuts the wires of the connector, discards the severed portion attached to the old connector, and strips away a short portion of the insulation from the ends of the wires 260. Next, the exposed ends of the wires 260 are inserted into the three butt splices 130. The ends of the wires 260 of the pigtail connector 120 are similarly inserted into the other ends of the three butt splices 130. The butt splices 130 are then crimped on each end so that the wires remain in place. Heat shrink tubing 140 is then used to cover the butt splices 130 and exposed wire. A heating tool is used on the tubing to cause it to shrink into place, protecting the wire from the environment and acting as a replacement for the wire insulation that was stripped away. The pigtail connector 120 is then attached to the pressure transducer 110.

Figure 2:
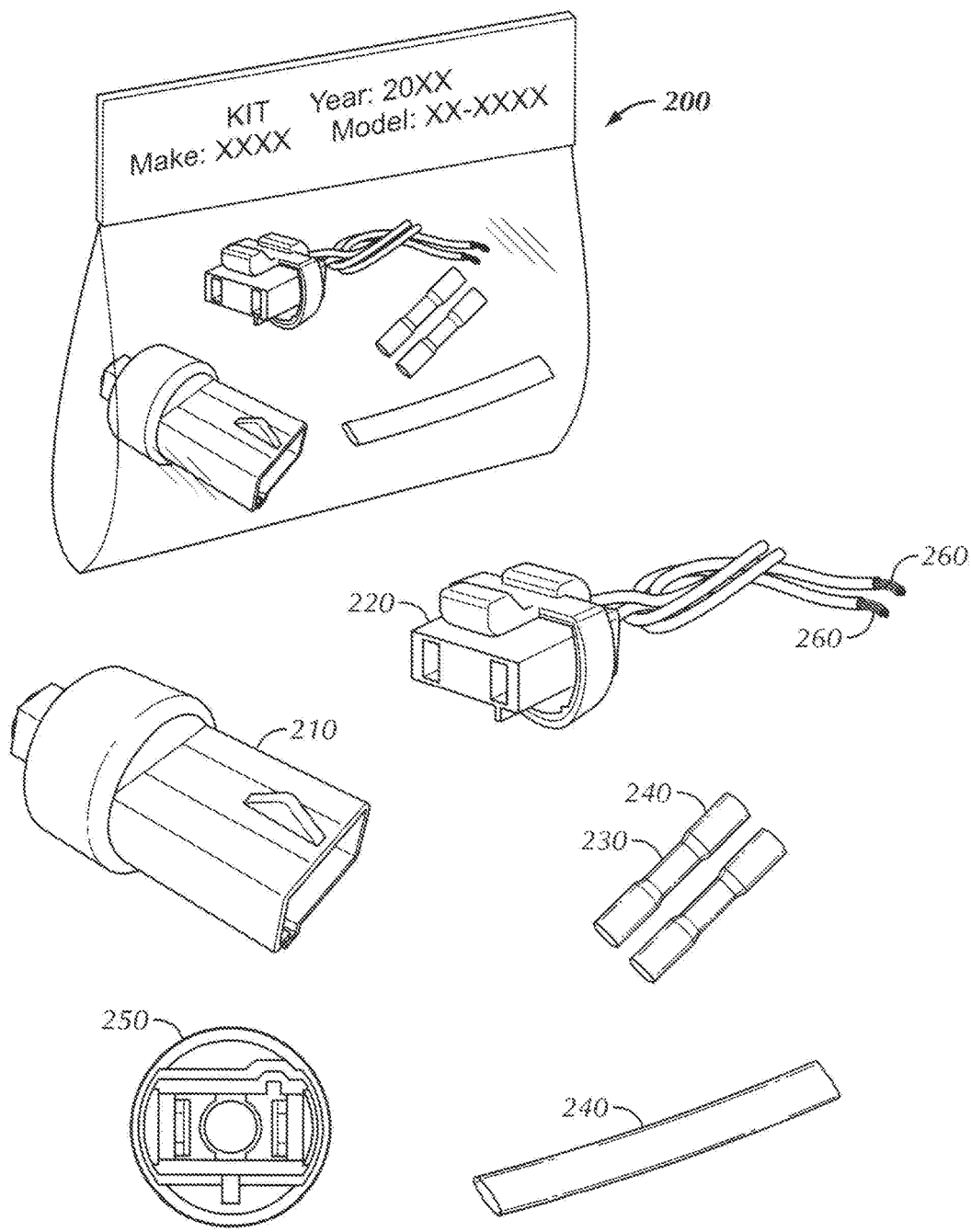
FIG. 2 shows an alternate pigtail kit containing a pressure switch along with a compatible pigtail connector and repair materials used to replace the connector in accordance with an exemplary embodiment of the invention.

Depending on the part and pigtail being replaced and the make, model, and year of the vehicle, the contents of the kit will vary. FIG. 2 shows an alternate pigtail kit 100 containing a pressure switch 210 along with a compatible pigtail connector 220 and repair materials used to replace the connector in accordance with an exemplary embodiment of the invention. The pigtail connector 120, 220 must be a match with the connector it is replacing so that it can successfully connect with the pressure transducer 110, pressure switch 210, or relay being replaced. Some parts, such as pressure transducers and pressure switches, require a seal such as an O-ring seal 150 in order to prevent leakages and avoid environmental contamination through the connection between the pressure transducer or switch and the pressurized system being measured. The size and type of seal will vary depending on the part. For example, pressure transducers 110 are usually sealed with O-ring seals 150, which may vary in size, material, and thickness.

Different parts will have different numbers of wires running from the connector which are cut during the replacement and must be repaired. The end and connection points of the pressure transducer 160 and pressure switch 250 is shown in FIGS. 1 and 2. Pressure transducers 110 typically have three wires, but some versions may have all the wires bundled within a single piece of insulation. Pressure switches 210 often have two wires. A relay for a signal from the compartment of the vehicle may have 5 or more wires. Each cut wire will need an independent butt splice 130, 230 to connect its severed end with the corresponding end of the pigtail connector, and will require a piece of heat shrink tubing 140, 240 to seal the wire against the environment. Depending on the thickness of the insulation and the gauge of the wire, different types of heat shrink tubing 140, 240 may be used to seal the wire from the environment. Some butt splices 130, 230 may include heat shrink tubing already attached to the butt splice and do not need additional heat shrink tubing shipped in the kit. In some embodiments, kits may include duplicate parts.

In other embodiments, the pigtail kit 100 may include the items necessary to repair a shorted connector for other parts used in a vehicle repairable with a pigtail. In one embodiment, the part is a sensor such as a coolant temperature sensors, engine management sensors, oil pressure sensors, or other similar sensors repairable with a pigtail that would be apparent to a person of ordinary skill in the art. In another embodiment, the part being repaired may be a resistor, such as a blower motor resistor used to control the speed of the fan in a vehicle's heating and air conditioning system. Each embodiment would include the part to be repaired, in combination with a corresponding pigtail connector 120, butt splices 130, and heat shrink tubing 140.

The diagrams in accordance with exemplary embodiments of the present invention are provided as examples and should not be construed to limit other embodiments within the scope of the invention. For instance, heights, widths, and thicknesses may not be to scale and should not be construed to limit the invention to the particular proportions illustrated. Additionally some elements illustrated in the singularity may actually be implemented in a plurality. Further, some element illustrated in the plurality could actually vary in count. Further, some elements illustrated in one form could actually vary in detail. Further yet, specific numerical data values (such as specific quantities, numbers, categories, etc.) or other specific information should be interpreted as illustrative for discussing exemplary embodiments. Such specific information is not provided to limit the invention.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. An automotive parts kit comprising;
    A first electrical automotive part which may be coupled to a pigtail connector;
    the pigtail connector which is compatible with the first electrical automotive part, wherein the pigtail connector has a connector side and a wire splicing side, wherein the connector side is coupled during repairs to the first electrical automotive part included in the automotive parts kit and the wire splicing side is spliced during repairs with one or more wires of a second automotive part not included in the kit to replace a damaged electrical connector;
    one or more butt splices, each having a large tube and a small tube; and
    heat shrink tubing is placed over one or more of the butt splices to provide a second layer of environmental and physical protection.

2. The automotive parts kit as described in claim 1, further comprising;
    one or more seals or gaskets used to secure the connection between the first electrical automotive part and a pressurized system of the vehicle.

3. The automotive parts kit as in claim 1, wherein the first electrical automotive part which may he coupled to the pigtail connector is a switch or transducer.

4. The automotive parts kit as in claim 1, wherein the first electrical automotive part which may be coupled to the pigtail connector is a relay.

* * * * *